United States Patent [19]

Van der Lely et al.

[11] 3,841,411
[45] Oct. 15, 1974

[54] CULTIVATOR AND TINES

[76] Inventors: Ary Van der Lely, 10, Weverskade, Maasland; Cornelis Johannes Gerardus Bom, 36, Esdoornlaan, Rozenburg, Netherlands

[22] Filed: Oct. 16, 1972

[21] Appl. No.: 297,671

Related U.S. Application Data

[62] Division of Ser. No. 172,511, Aug. 17, 1971, Pat. No. 3,774,689.

[52] U.S. Cl.................... 172/111, 172/59, 172/523, 172/713
[51] Int. Cl........................................... A01b 33/06
[58] Field of Search ............ 172/59, 110, 111, 552, 172/523, 526, 713, 765, 771, 524, 525, 770

[56] References Cited
UNITED STATES PATENTS

| | | | |
|---|---|---|---|
| 656,722 | 8/1900 | Kraus | 172/713 |
| 1,033,574 | 7/1912 | Freeman | 172/713 |
| 2,403,078 | 7/1946 | Hettelsater | 37/142 R |
| 2,622,498 | 12/1952 | Wharton | 172/59 X |

FOREIGN PATENTS OR APPLICATIONS

| | | | |
|---|---|---|---|
| 672,723 | 11/1965 | Belgium | 172/523 |
| 1,941,002 | 12/1970 | Germany | 172/523 |
| 1,139,312 | 1/1969 | Great Britain | 172/713 |
| 6,805,358 | 10/1969 | Netherlands | 172/111 |
| 6,807,548 | 12/1969 | Netherlands | 172/59 |

*Primary Examiner*—Robert E. Pulfrey
*Assistant Examiner*—Paul T. Sewell
*Attorney, Agent, or Firm*—Mason, Mason & Albright

[57] ABSTRACT

A cultivator has rotatable soil-working members with tines and the tines each have an upper fastening portion connected to a rotatable support and a lower soil-working portion. The soil-working portion of each tine is inclined with respect to its fastening portion so that when a tine support is rotated about an upright axis, the soil-working portion trails with respect to the direction of rotation of the support. The tines also have angular cross-sections along at least part of their lengths with concave grooves. The cross-sections of a soil-working portion flattens towards its tip so that a larger diagonal measurement of the tip extends tangentially with respect to the axis about which the tine is rotated.

3 Claims, 7 Drawing Figures

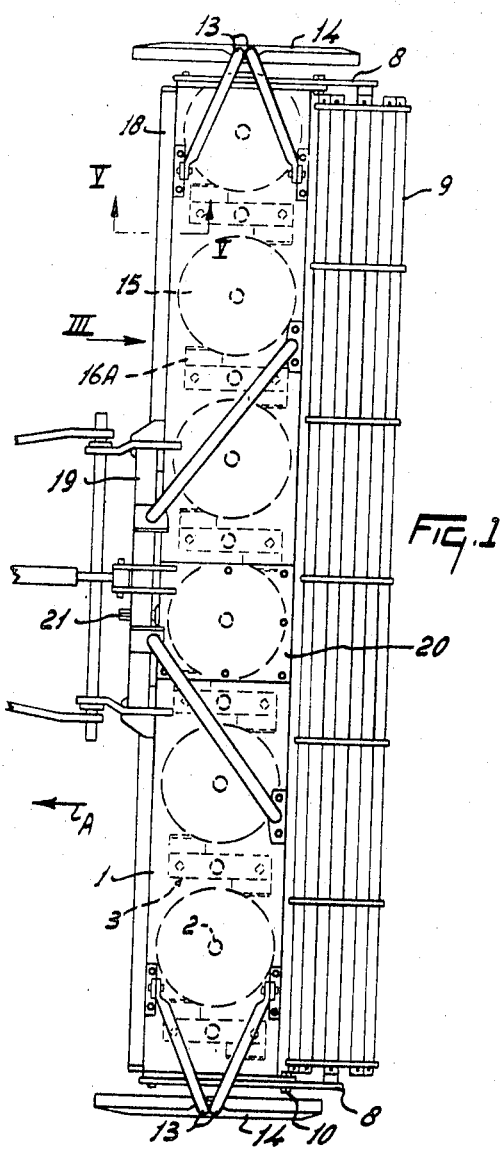
FIG.1
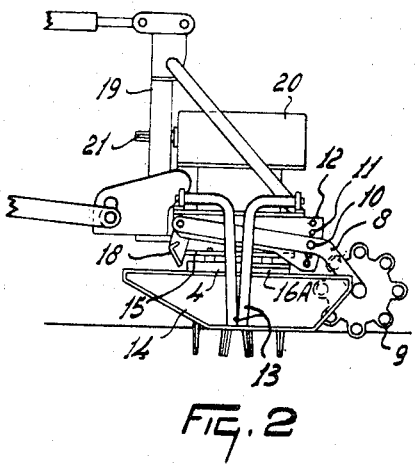
FIG.2
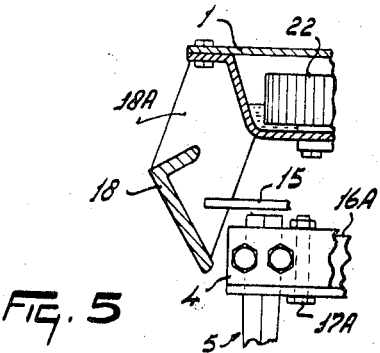
FIG.5
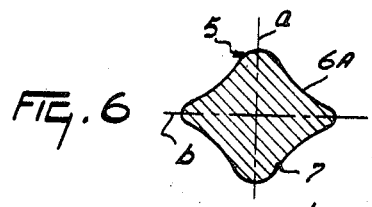
FIG.6
FIG.7

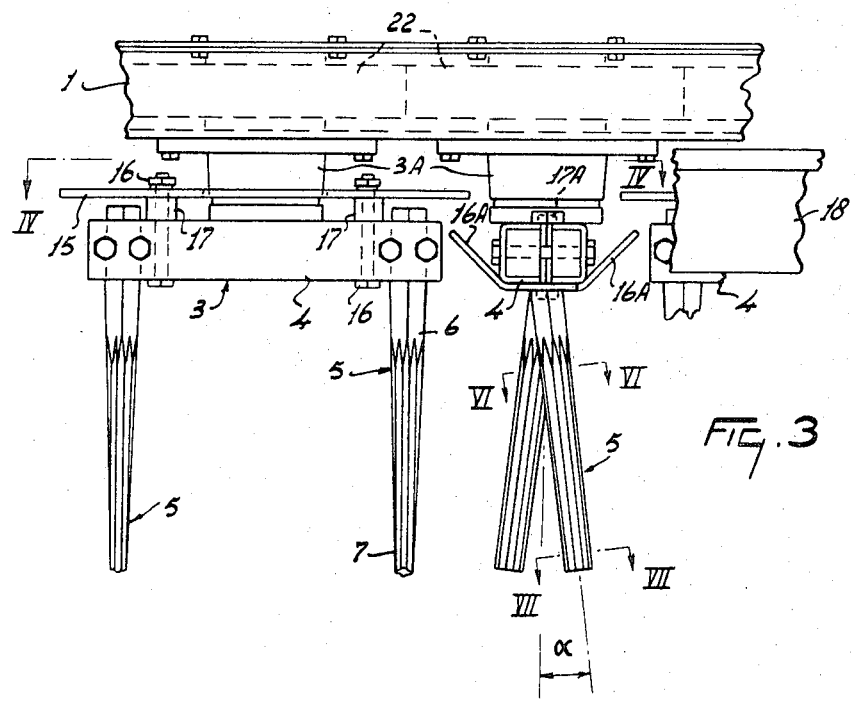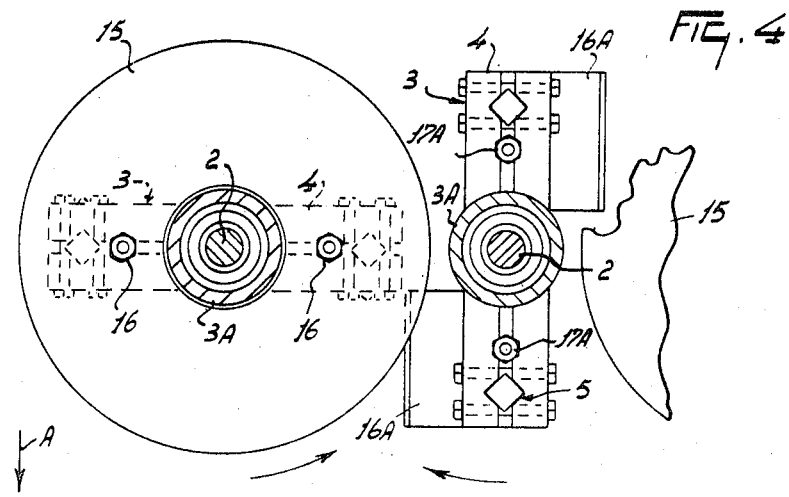

CULTIVATOR AND TINES

This is a division of application Ser. No. 172,511 filed Aug. 17, 1971 now U.S. Pat. No. 3,774,689.

According to the invention, there is provided a cultivator of the kind set forth, wherein the tine means have tines with a fastening portion and a soil working portion, said portions being inclined to one another and the working portion being arranged so as to trail with respect to the direction of rotation of the soil working members, at least the soil working portion having an angular cross-section, formed throughout at least part of their lengths with concave grooves.

For a better understanding of the invention, and to show how the same may be carried into effect, reference will now be made, by way of example, to the accompanying drawings, in which:

FIG. 1 is a plan view illustrating a cultivating implement or cultivator in accordance with the invention, FIG. 2 is a side elevation corresponding to FIG. 1, FIG. 3 is a partial front view, to an enlarged scale, as seen in the direction indicated by an arrow III in FIG. 2, FIG. 4 is a section taken on the line IV—IV of FIG. 3, FIG. 5 is a section, to an enlarged scale, taken on the line V—V of FIG. 1, FIG. 6 is a section, to an enlarged scale, taken on the line VI—VI of FIG. 3, and FIG. 7 is a section, to an enlarged scale, taken on the line VII—VII of FIG. 3.

Referring to the drawings, the soil cultivating implement or cultivator that is illustrated has a frame which is afforded principally by a light but strong hollow box-shaped beam 1 that extends substantially horizontally perpendicular to the intended direction of operative travel of the cultivator which is indicated by an arrow A in FIGS. 1 and 4 of the drawings. The beam 1 has a plurality (preferably twelve) of soil working members 3 rotatably mounted beneath it in a single row with the individual members in adjacent relationship with their neighbours. Each soil working member 3 is rotatable about the axis of a corresponding upright shaft 2 and each shaft 2 is rotatable in a corresponding substantially vertical bearing 3A (FIGS. 3 and 4) that is fastened to the bottom of the hollow frame beam 1. The lowermost end of each shaft 2 carries a corresponding elongated tine support 4 carrying two tines 5 at its opposite ends.

Each tine 5 preferably has an overall length of substantially 25 centimeters but said length may be as little as 20 centimeters or as great as 31 centimetres. Each tine 5 comprises an upper fasteninng portion 6 and a lower soil working portion 7, the two portions 6 and 7 being interconnected by an integral angular junction. The angular junction is such that the two portions 6 and 7 of each tine 5 are inclined to one another by an acute angle $\alpha$ (FIG. 3) of substantially 8°, and preferably not more than substantially 10°. It will be noted from FIG. 3 of the drawings that the perpendicular distance between the fastening portions 6 of the two tines 5 of each soil working member 3 is substantially the same as the perpendicular distance between the lowermost free ends or tips of the same tines. For most cultivating operations, it is preferable that the tines 5 should be arranged with their soil working portions 7 in trailing positions relative to the directions of rotation that are indicated by arrows in FIG. 4 of the drawings although it is, in fact, possible to arrange the fastening portions 6 of the tines in their supports 4 in such a way that the soil working portions 7 occupy leading positions relative to said directions of rotation.

The fastening portions 6 of the tines are of angular, and preferably square, cross-section throughout their lengths but the soil working portions 7 of the tines taper downwardly towards their free ends or tips and progressively alter in cross-section along their lengths. This progressive alteration in cross-section commences at a level that is a short distance below the integral junction between the two portions 6 and 7 of each tine. The cross-section remains generally rectangular but is such that, in the cross-sectional view, each corner is somewhat rounded while each side is of concave curved shape. FIG. 6 of the drawings shows a cross-section of one tine at a level towards the upper end of the soil working portion 7 thereof and it can be seen from FIG. 3 of the drawings that the concave grooves 6A and 6A' which extend along the tines as a result of their cross-sectional shapes terminate in points at their upper ends, said points actually being junctions with portions of the tines that are of truly square or other rectangular cross-section. FIG. 7 is a similar cross-section to that of FIG. 6 but taken at a level very close to the lowermost free end or tip of the corresponding tine 5. The formation of the grooves along the lengths of the soil working portions of the tines facilitates hardening of the metal from which they are formed during their manufacture and the flattening of the tines towards their tips, which can be seen from a comparison of FIGS. 6 and 7 of the drawings, effectively produces a soil-cutting leading edge to each tine. At a level corresponding to the cross-section of FIG. 6, the diagonal $b$ (in cross-section) of the tine has a length which is longer than the length of the diagonal $a$ at a level corresponding to the cross-section of FIG. 7 the length is preferably substantially twice the length of the shorter diagonal, the longer diagonal extending substantially tangentially with respect to a circle centered upon the axis of rotation of the corresponding shaft 2. The tine construction which has just been described is such that the soil working portions 7 of the tines are strong enough to move through hard soil without breakage or rapid wear while the flattened configuration maintains the resistance to movement of the tines through the soil to a magnitude similar to that which would exist of thinner and correspondingly weaker tines were to be employed. The cutting edges of the tines crumble the soil to a large extent but the tines do not bodily displace the soil very far since it moves away from each cutting edge along the lengths of the upright tine grooves. A strip of soil with a flat uniformly crumbled surface is thus produced after a traverse of the cultivator.

The shafts 2 are preferably spaced apart from their neighbours by perpendicular distances of substantially 25 centimeters and, since the perpendicular distance between the tips of the two tines 5 of each soil working member 3 is of greater magnitude, the strips of ground worked by the individual members 3 overlap one another to produce, in effect, a single broad strip of worked ground during a traverse of the cultivator. Each end of the hollow frame beam 1 is provided with a corresponding arm 8, the two arms 8 extending rearwardly with respect to the direction A and being turnable about substantially horizontally aligned pivots at their leading ends. A soil compressing member in the form of a roller 9 is rotatably mounted between the rearmost ends of the two arms 8 which arms can be retained in chosen angular settings about their pivotal connections with end plates 12 of the beam 1 by entering locking pins or bolts 10 in appropriately chosen holes 11 of arcuate rows of such holes that are formed in generally sectorshaped rear portions of the end plates 12. It will be apparent that the holes 11 that are chosen to cooperate with the locking pins or bolts 10 effectively determine the working depths of the tines 5. It can be seen from FIGS. 1 and 2 of the drawings that the roller 9 is not a smooth-surfaced roller. The roller has a central rotary shaft around which eight tubular ground-engaging members are movably arranged in regularly spaced-apart relationship with the aid of seven supports rigidly secured to the central shaft of the roller.

Two side or end plates 14 are arranged alongside the opposite ends of the beam 1 so as to be contained in planes that are normally substantially vertical and that extend substantially parallel to the direction A. The plates 14 are turnable about substantially horizontal pivots that extend parallel to the direction A on top of the beam 1, pairs of rigid profiled arms 13 being employed to couple the plates 14 to the corresponding pivots. When the cultivator is being transported without performing any working operation, the plates 14 and arms 13 are preferably, but not essentially, turned upwardly through approximately 180° about the axes of their pivots so that the plates 14 can lie in inverted positions on top of the beam 1.

The tine supports 4 of alternate soil working members 3 of the row thereof are provided with screening elements in the form of substantially horizontal circular discs 15, these discs having central apertures that co-operate with the corresponding shafts 2. It is noted again that only every second soil working member 3 of the row of twelve such members is provided with a corresponding one of the discs 15. Each disc 15 has a diameter such that the periphery thereof is quite close to the or each shaft 2 of the or each neighbouring soil working member 3 that does not have a disc 15. The tine support 4 of each of these latter soil working members 3 is provided, instead, with two strip-shaped screening elements 16A, each element 16A extending inwardly from the radially outermost end of the corresponding tine support 4 to adjacent the corresponding shaft 2 and being secured to the tine support 4 concerned by a vertical bolt 17A located near one of the tines 5 between the two co-operating channel-shaped parts of the tine support 4. As can be seen in outline in the drawing, the two channel-shaped parts of each tine support 4 are clamped to one another by substantially horizontal bolts at opposite sides of the upper end of each tine fastening portion 6, the shanks of said bolts protruding into recesses (not visible) in the material of the tines in order to prevent axial displacement of thos tines relative to their supports 4. It can be seen from FIGS. 3 and 4 of the drawings that the discs 15 are mounted in a generally similar manner to the screening elements 16A. They are maintained in position by pairs of substantially vertical bolts 16 upper portions of which are surrounded by spacer sleeves 17 to locate the discs 15 a ove the upper ends of the corresponding tines 5. The leading edge of each screening element 16A with respect to the intended direction of rotation of the corresponding soil working member 3 is inclined upwardly at an angle of about 45° to the horizontal.

The front of the beam 1 with respect to the direction A is provided with a screening element in the form of a strip 18 the greater part of which is inclined downwardly, and rearwardly with respect to the direction A, to a region just above the lower levels of the tine supports 4 and thus to a level at least as low as, and preferably lower than, the uppermost extremities of the fastening portions 6 of the tines 5. The strip 18 extends between rigid supports 18A but, as an alternative which is not illustrated, the strip 18 may be arranged so that it can yield rearwardly against the action of springs about an axis extending horizontally perpendicular to the direction A. This arrangement avoids damage caused by stones finding their way between the strip 18 and the top of the tine supports 4. Although the part 18 has been referred to as a strip because of its elongated configuration, it will be seen from FIG. 5 of the drawings that it is, in fact, of a thick and rigid plate-like formation.

A trestle-shaped coupling member 19 constructed to co-operate with the lifting links of the three-point lifting device or hitch of an agricultural tractor or other vehicle is provided substantially centrally at the front of the cultivator and has its upper region connected by two inclined strengthening beams to regions at the top and rear of the beam 1 that are spaced apart from the centre of that beam. A gear box 20 is mounted on top of the beam 1 immediately to one side of the centre thereof and has a forwardly projecting splined or otherwise keyed rotary input shaft 21 that can be placed in driven connection with the power take-off shaft of the tractor or other vehicle, to which the coupling member 19 is connected, by way of a conventional telescopic transmission shaft having universal joints at its opposite ends. The rotary shafts 2 of the soil working members 3 are rotated in directions that are relatively opposite to their neighbours by a train of intermeshing pinions 22 that are contained inside the hollow beam 1 and that are powered from the input shaft 21 by way of bevel pinions contained within the gear box 20. The pinions 22 rotate in an oil bath and their arrangement can be seen in outline in FIGS. 3 and 5 of the drawings.

In the use of the cultivator which has been described, it is moved over the ground which is to be worked in the direction A with each soil working member 3 rotating in a direction opposite to its neighbour, or to both of its neighbours, as indicated by the arrows in FIG. 4 of the drawings. The screening plates 14 at opposite ends of the row of soil working members 3 are arranged in the operative positions shown in FIGS. 1 and 2 of the drawings with the arms turnable freely about their pivots so that said plates 14 can move upwardly and downwardly as may be required to match undulations in the surface of the soil over which the cultivator is travelling. The roller 9 acts to break up any remaining surface lumps in the soil and effects a degree of compression of the worked soil sufficient to avoid excessive and rapid drying of that soil. It will be remembered that it is the vertical setting of the axis of rotation of the roller 9 relative to the level of the remainder of the cultivator that principally governs the effective working depths of the tines 5. The various screening elements that have been described act together to bring damage to the bearing 3A and tine supports 4, in particular, to a minimum as a result of sharp stones and the like rapidly displaced by the tines 5. The plate-like screening strip 18 tends to deflect any flying stones downwardly into the soil that is being worked and the screening discs 15 and screening strips 16A act to remove any stones from points where they would damage the bearings 3A or the bottom of the beam 1. The stones are deflected downwardly into the worked soil and the cultivator passes thereover without damage in almost every case. Jamming of the moving parts of the cultivator is, accordingly, extremely uncommon.

While various features of the cultivator that has been described, and that is illustrated in the drawings, will be set forth in the following claims as inventive features, it is to be noted that the invention is not necessarily limited to these features and that it encompasses all of the features that have been described and illustrated both individually and in various combinations.

Having thus described my invention, what I claim as new and desire to secure by Letters Patent of the United States is:

1. A cultivator comprising at least one soil-working member of said cultivator, said soil-working member comprising a support on a shaft rotatable about an upwardly extending axis, tine means secured to said support and depending downwardly towards the ground, sid tine means being offset from said shaft and positioned to trace a circular path on the ground during rotation, said tine means including a tine having an upper fastening portion secured to said support and a lower straight soil-working portion being inclined and extending downwardly in a trailing position with respect to the intended direction of rotation, said soil-working portion having sides comprising concave grooves and said sides having rounded corners therebetween and terminating in a tip, said soil-working portion being gradually flattened towards said tip, the cross-section of said soil-working portion having two relatively perpendicular diagonal measurements which vary from one another along the length of said soil-working portion, one of said measurements being progressively longer than the other towards said tip, and said one diagonal measurement extending substantially tangentially with respect to a circle centered upon the axis of rotation of said shaft, whereby said soil-working portion is sufficiently strong to be moved through hard soil and said tine prepares a strip of soil with a crumbled surface during operation.

2. A cultivator as claimed in claim 1, wherein said soil-working portion, when viewed in cross-section has grooves, each groove being located substantially symmetrically between two corners of a side of said tine and extending throughout substantially the whole of the distance between those corners.

3. A cultivator as claimed in claim 1, wherein the angle of inclination between said fastening portion and said soil-working portion is about 8°.

* * * * *